Dec. 30, 1924.
J. P. DOOLING
1,521,081
VALVE FOR INFLATABLE ARTICLES
Filed Jan. 10, 1924
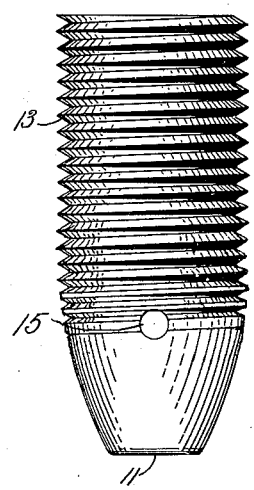
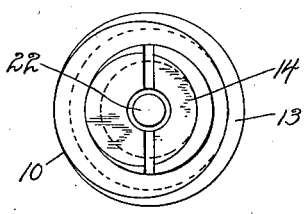
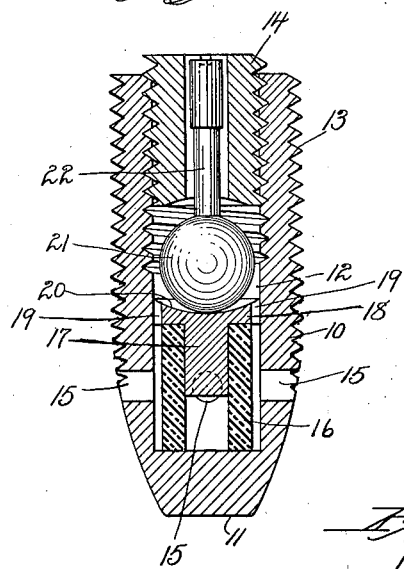
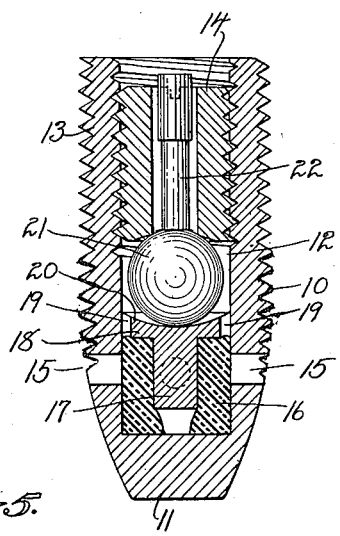
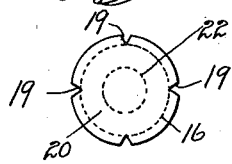

Patented Dec. 30, 1924.

1,521,081

UNITED STATES PATENT OFFICE.

JOSEPH P. DOOLING, OF NEW HAVEN, CONNECTICUT.

VALVE FOR INFLATABLE ARTICLES.

Application filed January 10, 1924. Serial No. 685,313.

*To all whom it may concern:*

Be it known that I, JOSEPH P. DOOLING, a citizen of the United States, residing at New Haven, in the county of New Haven and State of Connecticut, have invented a new and useful Improvement in Valves for Inflatable Articles; and I do hereby declare the following, when taken in connection with the accompanying drawings and the characters of reference marked thereon, to be a full, clear, and exact description of the same, and which said drawings constitute part of this application, and represent, in—

Fig. 1 a side view of a valve for inflatable articles, constructed in accordance with my invention.

Fig. 2 a plan view thereof.

Fig. 3 a sectional view with the parts in the open position.

Fig. 4 a similar view, with the parts in the closed position.

Fig. 5 a plan view of the plunger, detached.

This invention relates to improvement in valves for inflatable rubber articles, such, for instance, as footballs, basketballs, rubber cushions, etc. The object of the invention is to provide a simple form of valve, which may be permanently located in the articles which may be readily opened for the admission of air, but which will firmly resist the escape of air, and the invention consists in the construction as hereinafter described and particularly recited in the claims.

In carrying out my invention, I employ a bullet-shaped casing 10, having a blunt inner end 11 and formed with a longitudinal chamber 12. The outer end of the casing is formed with threads 13, by which the device may be mounted in the rubber article, so that the casing extends into the article, the outer end being flush with the outer surface thereof. The outer end of the chamber 12 is also internally threaded to receive a screw-plug 14. Opening into the chamber, near its inner end, are a series of ports 15, and in this chamber is a collar 16 of flexible rubber, this collar being mounted on a plunger 17, formed with a head 18 in the periphery of which are a series of notches 19, the outer face 20 of the plunger being slightly concaved, to form a seat for a ball 21, formed at the lower end of a stem 22, which extends through the screw-plug 14, which plug, when turned inward, will force the ball downward, and hence push the plunger 17 inward, and this inward movement of the plunger expands the collar 16, so as to close the ports 15.

To inflate the article, the plug 14 is turned outward, so as to allow the flexible collar 16 to straighten out, so to speak, as shown in Fig. 3 of the drawings, and the device is coupled with an inflating pump or other air-supplying means, in the usual way, and air passes through the screw-plug 14 and through the notches 19 in the plunger, and through the ports 15, in the article. When inflated to the desired degree, the plug 14 is screwed inward, forcing the ball onto the head of the plunger 17, so as to expand the collar 16 and close the ports 15, as shown in Fig. 4 of the drawings. When in this position, air cannot escape.

To deflate an article, it is only necessary to turn the plug 14 outward, which permits the collar to retract and thus open the ports 15, through which the air will escape.

It will be understood that these devices are quite small and will not injure the articles, when they are packed for shipment in a collapsed condition, and yet, by providing a plurality of ports 15, the article can be quickly inflated, and all the ports are simultaneously closed by the expansion of the flexible collar.

I claim:

1. A valve for inflatable rubber articles, comprising a casing having a longitudinal chamber closed at its inner end, a port in one side of chamber near the inner end thereof, an expansible port-closure seated in the inner end of said chamber, a plunger bearing on said port-closure, and a screw-plug mounted in the outer end of said chamber and adapted to force the port-closure inward, whereby it is expanded and the port closed.

2. A valve for inflatable rubber articles, comprising a casing having a longitudinal chamber, a plurality of ports entering the said chamber, near the inner end thereof, an expansible collar in the inner end of the said chamber, a plunger entering said collar, a ball resting on said plunger, said ball formed with an oppositely-projecting stem, and a screw-plug mounted in the outer end of said chamber and adapted to force the ball inward, whereby the collar is expanded.

3. A valve for inflatable rubber articles, comprising a casing having a longitudinal, outwardly-opening chamber and a flat inner end, and formed with ports opening into the chamber, near the inner end of the casing, the outer end of the casing internally threaded, an expansible collar in the inner end of the casing, a plunger entered into said collar and formed with a head resting upon the upper edge of the collar, a ball resting on said head and formed with an outwardly-projecting stem, and a screw-plug entered into the outer end of the chamber and formed with a clearance-opening for the said stem, and adapted, when turned inward, to force the ball downward and expand the said collar, whereby said ports are closed.

In testimony whereof, I have signed this specification in the presence of two subscribing witnesses.

JOSEPH P. DOOLING.

Witnesses:
JAMES R. CALDWELL,
J. W. PATTERSON.